Jan. 6, 1925.  
F. A. DORION  
1,522,231
CHEESE BOX
Filed June 18, 1923
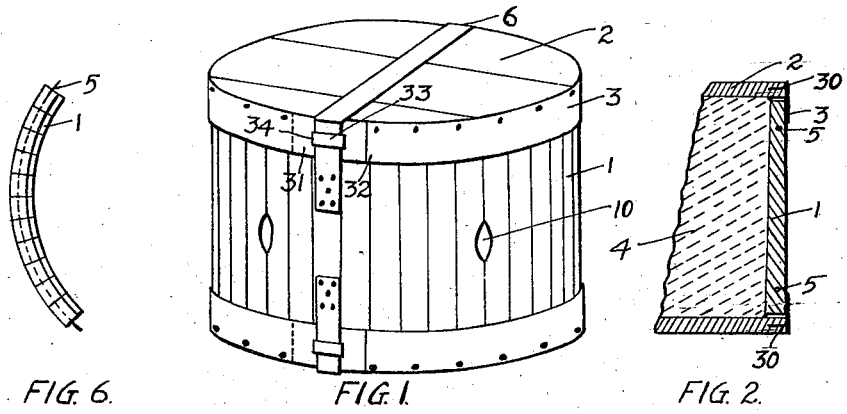
FIG. 6.  FIG. 1.  FIG. 2.
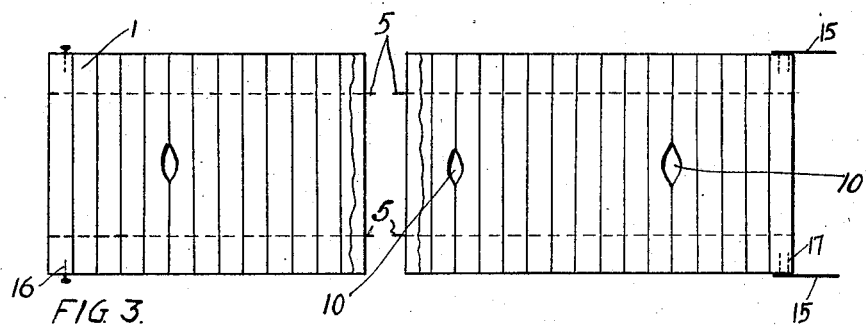
FIG. 3.
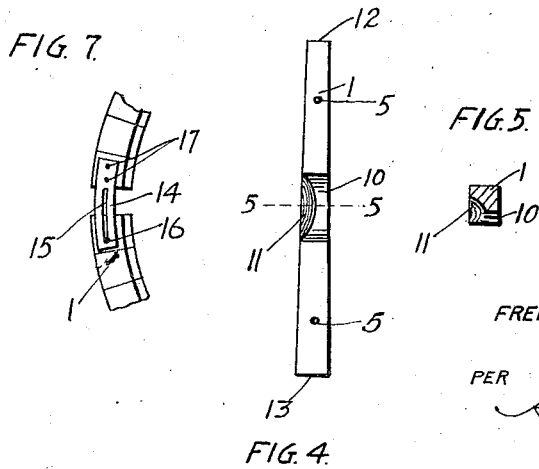
FIG. 7.  
FIG. 5.  
FIG. 4.
FREDERICK ADOLPHUS DORION.  
INVENTOR.  
PER
ATTORNEY.

Patented Jan. 6, 1925.

1,522,231

UNITED STATES PATENT OFFICE.

FREDERICK ADOLPHUS DORION, OF MONTREAL, QUEBEC, CANADA.

CHEESE BOX.

Application filed June 18, 1923. Serial No. 646,138.

*To all whom it may concern:*

Be it known that I, FREDERICK ADOLPHUS DORION, a subject of the King of Great Britain and Ireland, residing at the city of Montreal, in the Province of Quebec, Dominion of Canada, have invented new and useful Improvements in Cheese Boxes, of which the following is a specification.

My invention relates to containers, more particularly to containers adapted for transporting cheese and the like.

My object is to provide a knockdown cheese box of strong and durable construction that will protect the cheese contained in it from damage and deterioration during transport.

A further object is to provide a cheese box that can be knocked down, stacked and returned from the destination to the cheese factory or packer.

The cheese box in general use at the present time is constructed of bent sheets of thin wood forming a cylinder with caps of the same or light material, the whole forming a non-rigid and easily damaged container. Owing to the rough handling in transportation a large proportion of cheeses reach their destination in a damaged condition thereby causing great loss to the shipper.

By means of my invention this loss is avoided and a better product is placed on the market.

My invention has other improved features which will be set forth hereunder.

Reference is made to the annexed drawings in which:

Figure 1 is a perspective view of the box.

Figure 2 is a radial section of the box and contents.

Figure 3 is a view of the side wall of the box flattened out.

Figure 4 is a side view of one of the staves.

Figure 5 is a cross section of Figure 4 on the line 5—5.

Figure 6 is a top view of a portion of the side wall in position.

Figure 7 shows the plate connecting the end staves, in detail.

In Figure 1 the side walls consist of thick and strong staves 1 connected by wires 5—5. These staves may be made thicker at the bottom 13 than at the top 12 as shown in Figure 4.

Two or more apertures 10—10 are cut in the sides of adjoining staves 1 and the inner edges 11 of the cut away edges are beveled to provide handles to the box.

The caps forming the top and bottom consist of wooden discs 2 with sheet metal rims 3 secured by nails 30. The overlapping ends of the rims 3 may be secured by temporary or permanent fasteners as desired.

Metal strips 6 secured to the discs 2—2 are bent over the rims 3 and nailed to the wall 1 when the box has been filled.

These strips 6 may provide means of locking the overlapping ends 31, 32, of the rims as shown in Figure 1, where one or more horizontal loops 33 in the inner end 32 project through apertures 34 in the outer end 31 and are secured in position by the strip 6 being passed through the loop or loops 33 and then nailed to the adjacent stave beyond the edge of the rim. Loops 33 may be provided to receive the strips at other points.

In order to maintain the two ends of the wall in alignment the stave at one end is provided with projecting slotted plates 14 secured by nails 17, and which are secured to the stave at the other end by nails 16 passing through the slots 15 as shown in Figure 7.

By means of this construction a cheap, compact and serviceable container is provided which will stand rough usage in transport without permitting the contents to be damaged. The cheese which has slightly conical sides fits securely in the wall 1. The covers when adjusted and secured by the metal strips prevent any movement of the cheese within the box.

The apertures provide a ready means of permitting testing and sampling and the handles enable the easy gripping of the box by the operator.

When the box has reached its destination and its contents have been removed the sides are flattened out and stacked, the rims may also be disconnected from the discs and bundled. These are then returned to the cheese factory to be used again.

I do not confine my invention to the exact construction above set forth as detailed changes may be adopted without affecting the nature of the invention.

What I claim is:

1. In a collapsible cheese box the combination of top and bottom covers having removable sheet metal rims adapted to be bundled when flat with a side wall of thick wired staves, and means to maintain the adjacent end staves in alignment.

2. In a collapsible cheese box the combination of top and bottom covers consisting of a wooden disc and sheet metal rim removably attached thereto adapted to be bundled when flat with a side wall of thick wired staves adapted to knock down.

3. In a collapsible cheese box the combination of top and bottom covers having sheet metal rims removably attached thereto adapted to be bundled when flat with a side wall of thick wired staves having central apertures therein and means to maintain the adjacent end staves in alignment.

4. In a collapsible cheese box the combination of top and bottom covers, comprising a wooden disc and sheet metal rim removably attached thereto adapted to be bundled when flat with a side wall of thick wired staves thickening downwardly to form a slightly conical interior and means to maintain the adjacent end staves in alignment.

5. In a collapsible cheese box the combination of top and bottom covers, comprising a wooden disc, a sheet metal rim removably secured to the edge thereof adapted to be bundled when flat with a side wall of thick wired staves, central apertures in the walls adapted to permit sampling and bevelled inner edges to the apertures adapted to provide handles to the box.

6. In a collapsible cheese box the combination of top and bottom covers, comprising wooden discs, sheet metal rims secured to the edge thereof, means to interlock the overlapping ends of the rims, with a side wall of wired staves and means to maintain the adjacent end staves in alignment.

7. In a collapsible cheese box the combination of top and bottom covers, comprising wooden discs, rims of sheet metal secured to the edge thereof, a loop in the inner end of the rim and an aperture in the outer overlapping end through which the loop projects, a metal strip secured to the outer surface of the disc and adapted to be bent and pass through loop of rim and secured to stave of side wall, with a side wall of staves wired together and adapted to knock down.

FREDERICK ADOLPHUS DORION.